(12) United States Patent
Lee et al.

(10) Patent No.: US 10,532,630 B2
(45) Date of Patent: Jan. 14, 2020

(54) HVAC SYSTEM OF VEHICLE

(71) Applicants: HYUNDAI MOTOR COMPANY, Seoul (KR); KIA MOTORS CORPORATION, Seoul (KR)

(72) Inventors: Sang Shin Lee, Suwon-si (KR); Jae Woo Park, Ansan-si (KR); So Yoon Park, Suwon-si (KR); Man Ju Oh, Yongin-si (KR); Jae Woong Kim, Hwaseong-si (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 28 days.

(21) Appl. No.: 15/824,713

(22) Filed: Nov. 28, 2017

(65) Prior Publication Data
US 2019/0047361 A1 Feb. 14, 2019

(30) Foreign Application Priority Data
Aug. 9, 2017 (KR) .................. 10-2017-0101108

(51) Int. Cl.
*F25B 1/00* (2006.01)
*B60H 1/00* (2006.01)
(Continued)

(52) U.S. Cl.
CPC ..... *B60H 1/00885* (2013.01); *B60H 1/00278* (2013.01); *B60H 1/00385* (2013.01);
(Continued)

(58) Field of Classification Search
CPC ........... B60H 1/00885; B60H 1/00278; B60H 1/00385; B60H 2001/00928;
(Continued)

(56) References Cited

U.S. PATENT DOCUMENTS 7,975,757 B2 * 7/2011 Nemesh ............. B60H 1/00278
165/42
2008/0251235 A1 * 10/2008 Zhou .................. B60H 1/00278
165/41
(Continued)

FOREIGN PATENT DOCUMENTS

KR 10-0970336 B1 7/2010
KR 10-1448656 B1 10/2014
(Continued)

*Primary Examiner* — Henry T Crenshaw
*Assistant Examiner* — Kamran Tavakoldavani
(74) *Attorney, Agent, or Firm* — Morgan, Lewis & Bockius LLP

(57) ABSTRACT

A heating, ventilating, air conditioning (HVAC) system of a vehicle includes: a battery circulation line having a battery radiator, a main valve, a high voltage battery core, and a cooling heat exchanger so as to circulate a first coolant therethrough, with the cooling heat exchanger being provided to be heat-exchangeable with an indoor HVAC refrigerant line; a branch line including a water heating heater and selectively connected to the battery circulation line through the main valve; and a controller selectively cooling or heating the high voltage battery core by controlling an operation of the main valve, the water heating heater, and the indoor HVAC refrigerant line.

14 Claims, 4 Drawing Sheets

(51) Int. Cl.
*B60L 58/26* (2019.01)
*B60L 58/27* (2019.01)

(52) U.S. Cl.
CPC .............. *B60L 58/26* (2019.02); *B60L 58/27* (2019.02); *B60H 2001/00928* (2013.01)

(58) Field of Classification Search
CPC .............. B60H 1/32281; B60H 1/3204; B60H 1/3205; B60H 1/3222; B60H 1/3223; B60H 1/3225; B60H 1/3226; B60H 1/3227; B60H 1/3229; B60H 1/323; B60H 1/3232; B60H 1/321; B60H 2001/00307; B60H 2001/00949; B60L 11/1874; B60L 11/1875
See application file for complete search history.

(56) References Cited

U.S. PATENT DOCUMENTS

2011/0214838 A1\* 9/2011 Akiyama ........... B60H 1/00278
165/41
2014/0041826 A1\* 2/2014 Takeuchi ................. B60L 1/02
165/10
2016/0344075 A1\* 11/2016 Blatchley .............. H01M 10/66

FOREIGN PATENT DOCUMENTS

KR  10-2015-0098729 A   8/2015
KR  10-2016-0055702 A   5/2016

\* cited by examiner

HVAC SYSTEM OF VEHICLE

CROSS REFERENCE TO RELATED APPLICATION

This application is based on and claims the benefit of priority to Korean Patent Application No. 10-2017-0101108 filed on Aug. 9, 2017, entitled "HVAC System of Vehicle", with the Korean Intellectual Property Office, which is hereby incorporated by reference in its entirety into this application.

TECHNICAL FIELD

The present invention relates to a heating, ventilating, and air conditioning (HVAC) system of a vehicle, and more particularly, to a heating, ventilating, and air conditioning (HVAC) system of a vehicle capable of reducing a consumption of energy and increasing a driving distance of the vehicle by efficiently cooling or heating a high voltage battery.

BACKGROUND

In order to implement eco-friendly technologies and to solve problems such as energy exhaustion, and the like, electric vehicles are recently emerging. An electric vehicle is operated using a motor that is supplied with electricity from a battery and outputs power. Therefore, since the electric vehicle has advantages in that it does not discharge carbon dioxide, generates very little noise, and has higher energy efficiency of the motor than that of an engine, the electric vehicle is highlighted as the eco-friendly vehicle.

A core technology of the electric vehicle is technologies related to a battery module, and researches on weight lightening, miniaturization, and a short charging time, and the like of the battery are actively conducted in recent years. The battery module may maintain optimal performance and long lifespan only when it is used in an optimal temperature environment. However, it is difficult to use the battery in the optimal temperature environment due to heat generated during a driving of the battery and an external temperature change.

In addition, since the electric vehicle does not have a source of waste heat generated during combustion in a separate engine such as an internal combustion engine, the electric vehicle performs an indoor heating of the vehicle in winter by an electric-type heater, and since the electric vehicle requires a warm-up to improve charging and discharging performance of the battery in cold weather, the electric vehicle each configures and uses a separate coolant heat-type electric heater. That is, in order to maintain the optimal temperature environment of the battery module, the electric vehicle adopts a technology of operating a cooling and heating system for adjusting a temperature of the battery module independently from a cooling and heating system for an indoor HAVC of a vehicle. In other words, the electric vehicle constructs two independent cooling and heating system, such that one is used to perform the indoor cooling and heating of the vehicle and the other is used to adjust the temperature of the battery module.

However, since the electric vehicle operated by the method as described above does not efficiently manage energy, it results in a short cruising distance and does not drive a long distance. Further, since the driving distance is reduced by 30% during cooling in summer and by 40% or more during heating in winter, a heating problem in winter, which was not a problem in the internal combustion engine, becomes even more serious.

In particular, in winter, an amount of heating the electronic components is greater than that of heating a high voltage battery part, and since the high voltage battery has a large contact area with air, cooling of the high voltage battery occurs more than the heating by a temperature of outside air during the driving. As a result, an appropriate temperature at which the high voltage battery is operated may not be satisfied and an output of the high voltage battery may be degraded. Therefore, in order to efficiently manage the high voltage battery in winter, the high voltage battery should be heated during the driving.

The matters described as the related art have been provided only for assisting in the understanding for the background of the present invention and should not be considered as corresponding to the related art known to those skilled in the art.

SUMMARY

An object of the present invention is to provide a heating, ventilating, and air conditioning (HVAC) system of a vehicle capable of increasing a driving distance and reducing the cost of production by efficiently managing energy required to heat an indoor of the vehicle and to increase a temperature of a battery.

According to an exemplary embodiment of the present invention, there is provided a heating, ventilating, air conditioning (HVAC) system of a vehicle including: a battery circulation line having a battery radiator, a main valve, a high voltage battery core, and a cooling heat exchanger so as to circulate a first coolant therethrough, with the cooling heat exchanger being provided to be heat-exchangeable with an indoor HVAC refrigerant line; a branch line including a water heating heater and selectively connected to the battery circulation line through the main valve; and a controller selectively cooling or heating the high voltage battery core by controlling an operation of the main valve, the water heating heater, and the indoor HVAC refrigerant line.

One terminal of the branch line may be connected to the main valve and another terminal thereof may be connected to the battery circulation line so that the first coolant bypasses the battery radiator by the branch line.

A portion of a line including the high voltage battery core and the cooling heat exchanger of the battery circulation line may be connected to the branch line to form a cooling and heating line, and the cooling and heating line may be a closed loop in which the first coolant circulates.

The cooling and heating line may include a circulation pump controlled by the controller, and the circulation pump may be positioned on the battery circulation line corresponding to the cooling and heating line.

The cooling heat exchanger may be positioned between a point to which the branch line and the battery circulation line are connected and the high voltage battery core, and may be provided on the battery circulation line corresponding to the cooling and heating line.

The main valve may be a 3-way valve and include a first port which is adjacent to the battery radiator, a second port which is adjacent to the water heating heater, and a third port which is adjacent to the high voltage battery core, and when the high voltage battery core needs to be cooled, the controller may perform a control so that the first coolant circulates through the cooling and heating line by closing the first port of the main valve and operating the indoor HVAC refrigerant line, is cooled by performing a heat-exchange with a refrigerant of the indoor HVAC refrigerant line in the cooling heat exchanger, and then cools the high voltage battery core.

The main valve may be a 3-way valve and include a first port which is adjacent to the battery radiator, a second port which is adjacent to the water heating heater, and a third port which is adjacent to the high voltage battery core, and when the high voltage battery core needs to be heated, the controller may perform a control so that the first coolant circulates through the cooling and heating line by closing the first port of the main valve and operating the water heating heater, is heated by the water heating heater, and then heats the high voltage battery core.

The main valve may be a 3-way valve and include a first port which is adjacent to the battery radiator, a second port which is adjacent to the water heating heater, and a third port which is adjacent to the high voltage battery core, and when the high voltage battery core needs to be cooled, the controller may perform a control so that the first coolant circulates through the battery circulation line by closing the second port of the main valve, is cooled by performing a heat-exchange with external air in the battery radiator, and then cools the high voltage battery core.

In a case of a cooling mode, the controller may control the main valve to circulate the first coolant through the branch line, and perform a control so that the first coolant cooled by the cooling heat exchanger cools the high voltage battery core.

In a case of a heating mode, the controller may control the main valve and the water heating heater to circulate the first coolant through the branch line, and perform a control so that the first coolant heated by the water heating heater heats the high voltage battery core.

In a case of an external air cooling mode, the controller may control the main valve to circulate the first coolant through the battery circulation line, and perform a control so that the first coolant cooled by the battery radiator cools the high voltage battery core.

The indoor HVAC refrigerant line may include an auxiliary valve that supplies or blocks a refrigerant so that the refrigerant of the indoor HVAC refrigerant line is heat-exchangeable with the first coolant of the battery circulation line in the cooling heat exchanger.

During a failure of the water heating heater, the controller may prevent the high voltage battery core from being damaged by a high temperature coolant which passes through the water heating heater and is introduced into the high voltage battery core by controlling the main valve to block the high temperature coolant from flowing into the branch line.

DETAILED DESCRIPTION

Hereinafter, a heating, ventilating, and air conditioning (HVAC) system of a vehicle according to exemplary embodiments of the present invention will be described with reference to the accompanying drawings.

Figure 1:
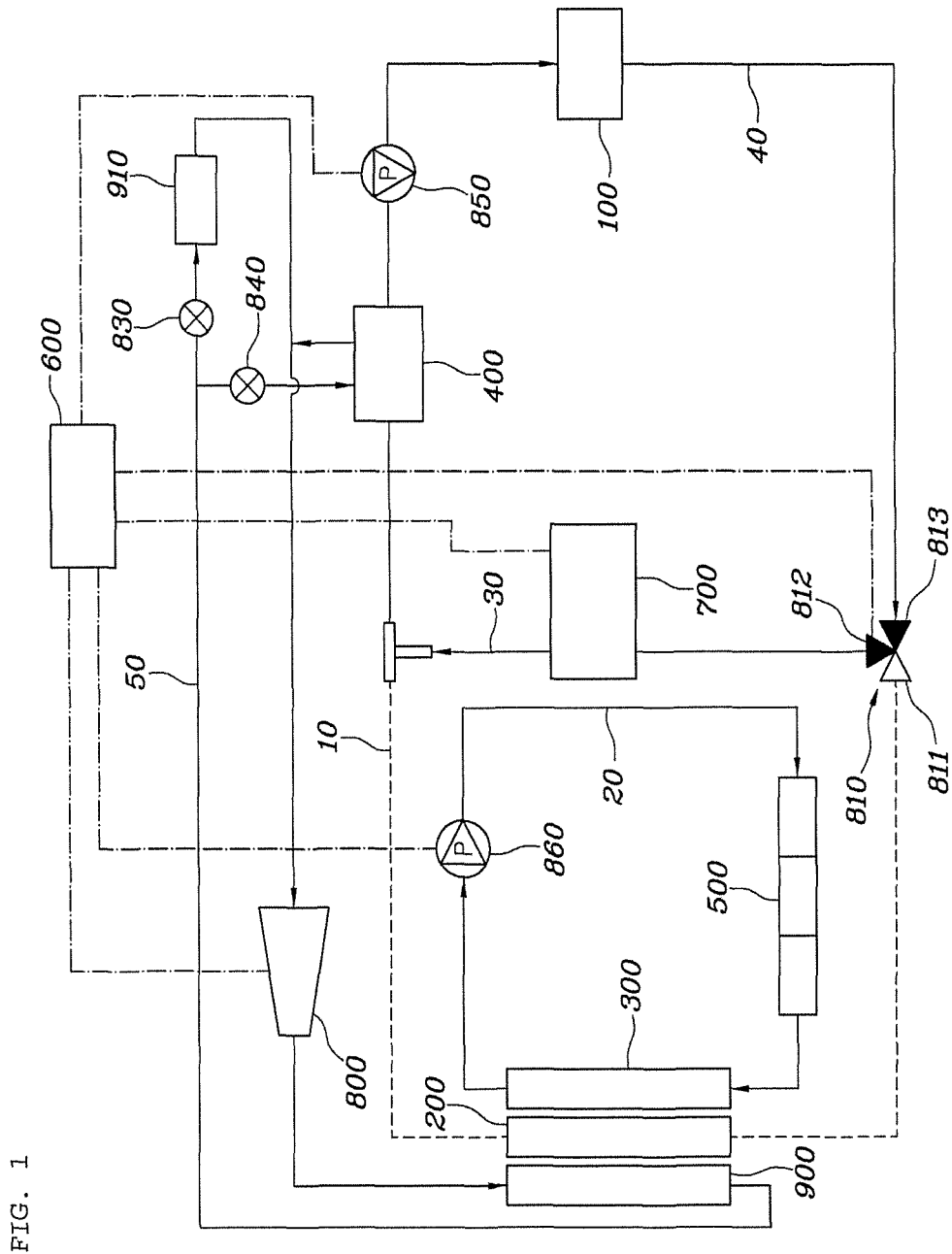
FIG. 1 is an illustrative view of a cooling mode of a heating, ventilating, and air conditioning (HVAC) system of a vehicle according to an exemplary embodiment of the present invention.
Figure 2:
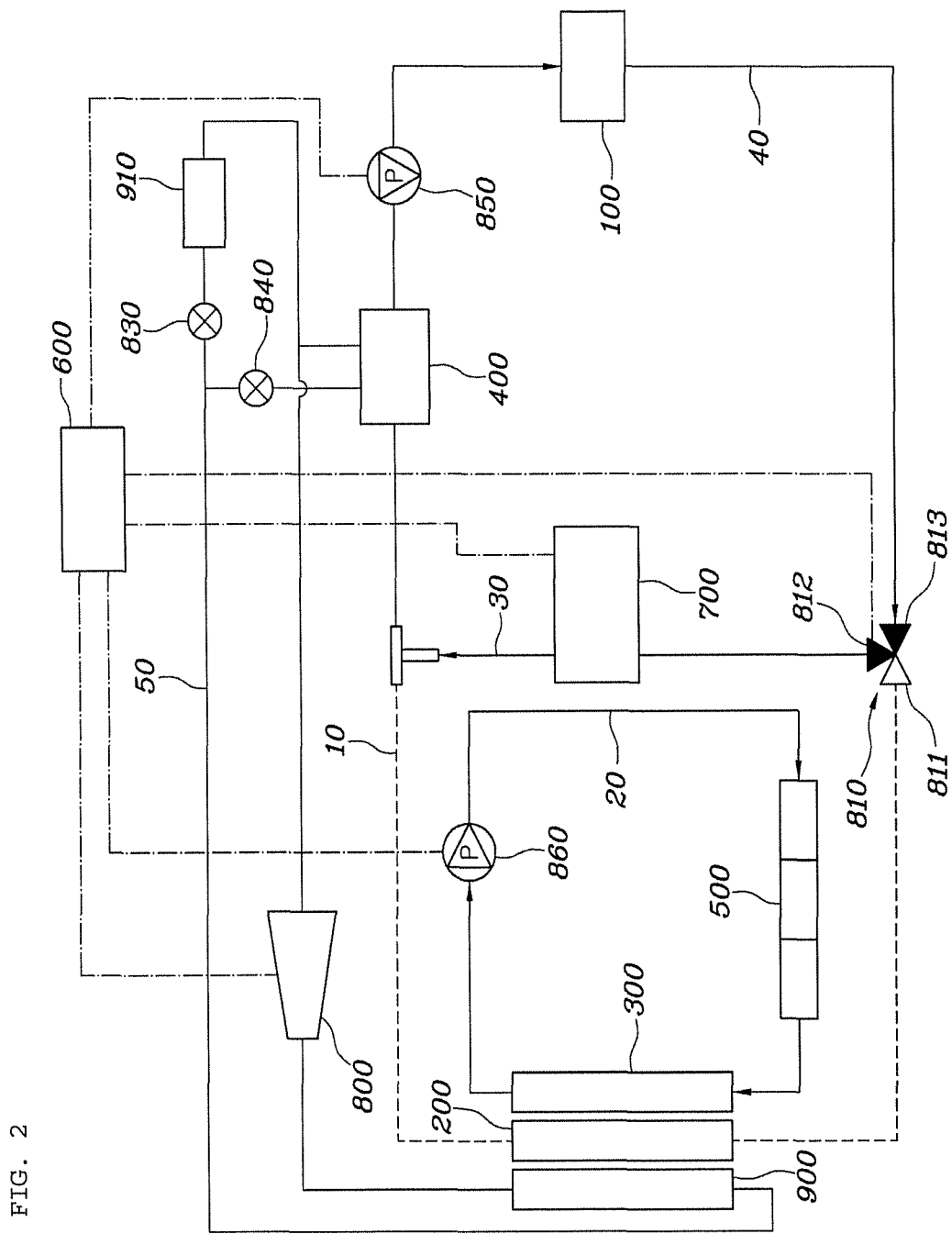
FIG. 2 is an illustrative view of a heating mode of the HVAC system of the vehicle according to an exemplary embodiment of the present invention.
Figure 3:
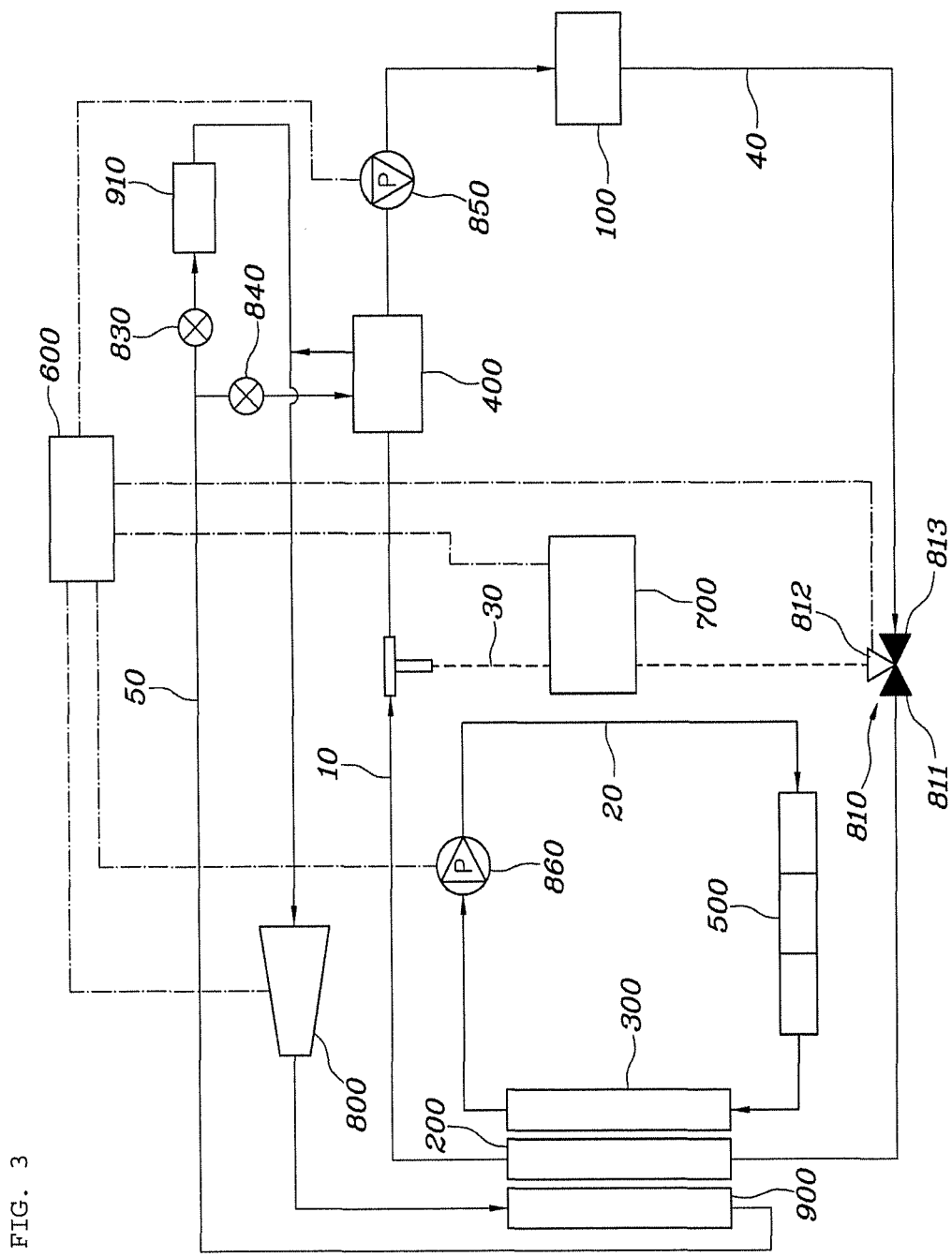
FIG. 3 is an illustrative view of an external air temperature cooling mode of the HVAC system of the vehicle according to an exemplary embodiment of the present invention.
Figure 4:
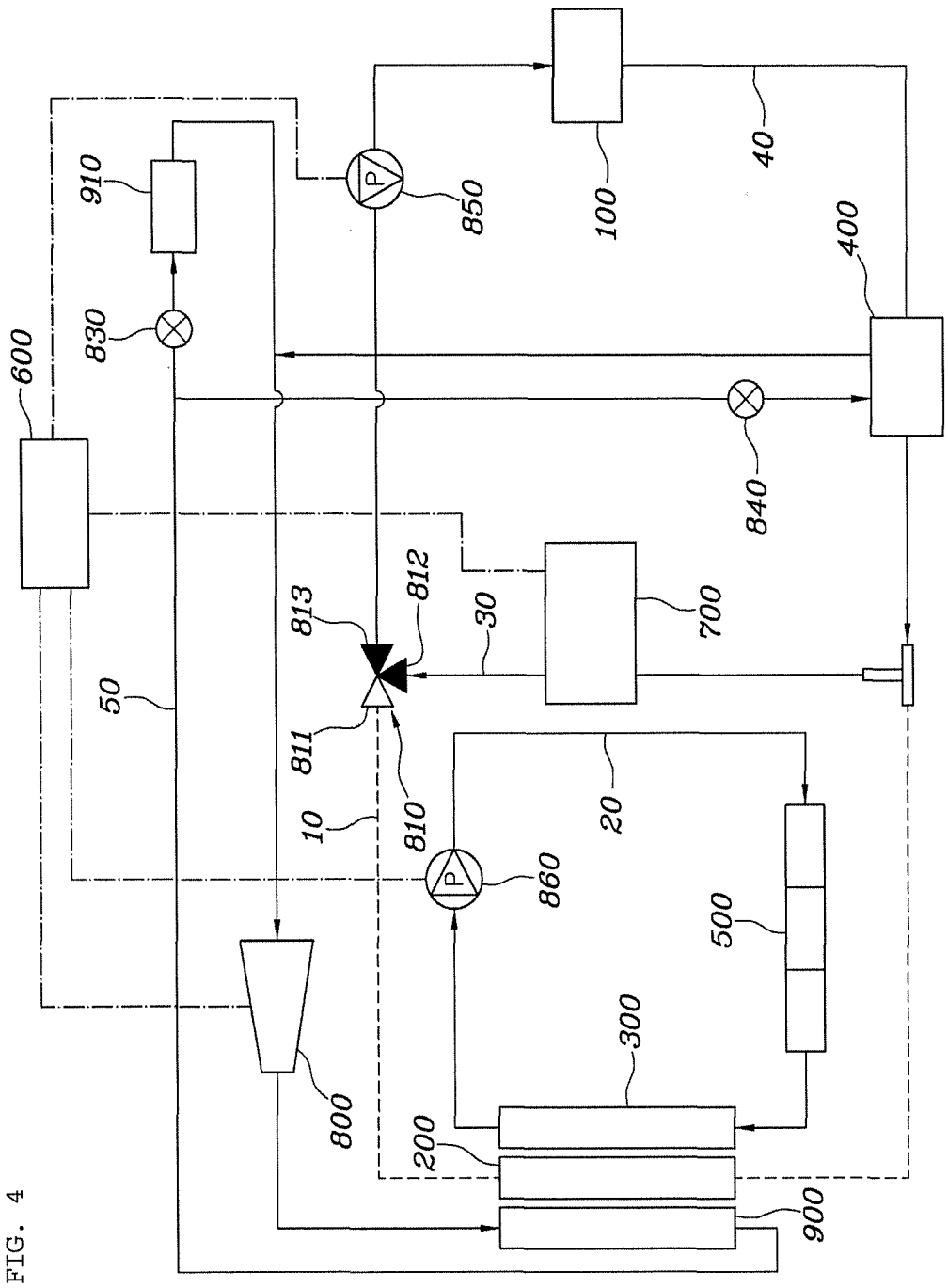
FIG. 4 is an illustrative view of a cooling mode of a heating, ventilating, and air conditioning (HVAC) of a vehicle according to another exemplary embodiment of the present invention.

FIG. 1 is an illustrative view of a cooling mode of the HVAC system of the vehicle according to an exemplary embodiment of the present invention, FIG. 2 is an illustrative view of a heating mode of the HVAC system of the vehicle according to an exemplary embodiment of the present invention, and FIG. 3 is an illustrative view of an external air temperature cooling mode of the HVAC system of the vehicle according to an exemplary embodiment of the present invention. In addition, FIG. 4 is an illustrative view of a cooling mode of a heating, ventilating, and air conditioning (HVAC) of a vehicle according to another exemplary embodiment of the present invention.

A heating, ventilating, air conditioning (HVAC) system of a vehicle according to an exemplary embodiment of the present invention includes a battery circulation line 10 having a battery radiator 200, a main valve 810, a high voltage battery core 100, and a cooling heat exchanger 400 so as to circulate a first coolant therethrough, with the cooling heat exchanger 400 being provided to be heat-exchangeable with an indoor HVAC refrigerant line 50; a branch line 30 including a water heating heater 700 and selectively connected to the battery circulation line 10 through the main valve 810; and a controller 600 selectively cooling or heating the high voltage battery core 100 by controlling an operation of the main valve 810, the water heating heater 700, and the indoor HVAC refrigerant line 50.

The controller 600 is an electric circuitry that executes instructions of software which thereby performs various functions described hereinafter.

The battery circulation line 10 has the battery radiator 200, the main valve 810, the high voltage battery core 100, and the cooling heat exchanger 400 so as to circulate the first coolant therethrough, and the cooling heat exchanger 400 is provided to be heat-exchangeable with the indoor HVAC refrigerant line 50. In addition, the battery circulation line 10 further includes a circulation pump 850 which is controlled to be driven or stopped by the controller 600. Therefore, the first coolant circulates within the battery circulation line 10 by an operation of the circulation pump 850. The order in which the first coolant circulates through the battery circulation line 10 will be described in more detail. As illustrated in FIGS. 1 to 3, the first coolant passes through the battery radiator 200, the cooling heat exchanger 400, the circulation pump 850, the high voltage battery core 100, and the main valve 810, and again then circulates through the battery radiator 200. As illustrated in FIG. 4, however, the order in which the first coolant circulates through the battery circulation line 10 may also be configured so that the first coolant passes through the battery radiator 200, the main valve 810, the circulation pump 850, the high voltage battery core 100, and the cooling heat exchanger 400, and again then circulates through the battery radiator 200. The above-mentioned path is particularly a path in which the first coolant circulates in the case of an external air cooling mode.

The branch line 30 includes the water heating heater 700 and is selectively connected to the battery circulation line 10 through the main valve 810. In more detail, one terminal of the branch line 30 is connected to the main valve 810 and the other terminal thereof is connected to the battery circulation line 10 so that the first coolant bypasses the battery radiator 200 by the branch line 30. The branch line 30 includes the water heating heater 700 which is controlled to be operated or stopped by the controller 600, and the water heating heater 700 is operated during heating of the high voltage battery core 100.

A portion of a line including the high voltage battery core 100, the circulation pump 850, and the cooling heat exchanger 400 of the battery circulation line 10 is connected to the branch line 30 to form a cooling and heating line 40. Further, the cooling and heating line 40 may be a closed loop in which the first coolant circulates. Therefore, the battery circulation line 10 has two different lines: a line in which the first coolant circulates in the case of the external air cooling mode and a line in which the first coolant circulates in the case of the cooling mode or the heating mode, and in particularly, the first coolant always flows in the line including the high voltage battery core 100, the circulation pump 850, and the cooling heat exchanger 400. In other words, the battery circulation line 10 has the battery radiator 200 disposed at one side of the branch line 30 and the cooling heat exchanger 400, the circulation pump 850, and the high voltage battery core 100 which are disposed at the other side of the branch line 30, such that the first coolant may circulate while implementing the closed loop in both the external air cooling mode and the cooling and heating mode, and it is possible to cool the high voltage battery core 100 by external air, to cool the high voltage battery core 100 by the cooling heat exchanger 400, or to heat the high voltage battery core 100 by the water heating heater 700. In addition, the main valve 810 may be positioned at any one position or more of an upstream position or a downstream position of the water heating heater 700 of the branch line 30, as illustrated in the drawings.

In particularly, the battery circulation line 10 is provided to be heat-exchangeable with the indoor HVAC refrigerant line 50 through the cooling heat exchanger 400. The indoor HVAC refrigerant line 50 includes a compressor 800, an air-cooled condenser 900, an expansion valve 840, and an evaporator 910. In addition, the indoor HVAC refrigerant line 50 has a line branched to allow a refrigerant of the indoor HVAC refrigerant line 50 to be heat-exchangeable in the cooling heat exchanger 400, and the branched line includes an auxiliary valve 840 controlled by the controller 600 to supply or block the refrigerant into the cooling heat exchanger 400. Therefore, in a case in which the indoor cooling and the cooling of the high voltage battery core 100 are required, the controller 600 operates the indoor HVAC refrigerant line 50. Here, the operating of the indoor HVAC refrigerant line 50 corresponds to driving the compressor 800 and circulating the refrigerant. Therefore, in the case in which the indoor cooling and the cooling of the high voltage battery core 100 are required, the first coolant which is heat-exchangeable with the indoor HVAC refrigerant line 50 cools the high voltage battery core 100.

In addition, the HVAC system of the vehicle according to the present invention further includes an electronic component cooling line 20 having an electronic radiator 300 and an electronic component core 500 so that a second coolant independently circulates, in addition to the battery circulation line 10, the branch line 30, and the cooling and heating line 40, and the indoor HVAC refrigerant line 50. The electronic component cooling line 20 includes an electronic pump 860, and the controller 600 controls the electronic pump 860 to be driven or stopped. Here, the electronic pump 860 may be positioned at any position within the closed loop.

The controller 600 selectively cools or heats the high voltage battery core 100 by controlling the operation of the main valve 810, the water heating heater 700, and the indoor HVAC refrigerant line 50. The main valve 810 may be a 3-way valve, but is not necessarily limited thereto. In the present specification, the main valve 810 will be described, for example, as the 3-way valve. The main valve 810 includes a first port 811 which is adjacent to the battery radiator 200, a second port 812 which is adjacent to the water heating heater 700, and a third port 813 which is adjacent to the high voltage battery core 100.

A flow of the coolant in the respective modes will be described with reference to the accompanying drawings.

FIG. 1 is an illustrative view of a cooling mode of a heating, ventilating, and air conditioning (HVAC) system of a vehicle according to an exemplary embodiment of the present invention. In the case of the cooling mode, the controller 600 controls the main valve 810 to circulate the first coolant through the branch line 30, and performs a control so that the first coolant is cooled by the refrigerant of the indoor HVAC refrigerant line 50 and the cooling heat exchanger 400 and then cools the high voltage battery core 100. Here, the water heating heater 700 is in a stopped state.

In more detail, in a case in which the high voltage battery core 100 needs to be cooled, the controller 600 controls the main valve 810, the indoor HVAC refrigerant line 50, and the circulation pump 850. Therefore, the controller 600 performs a control so that the first coolant circulates through the cooling heat exchanger 400, the circulation pump 850, the high voltage battery core 100, and the main valve 810 within the cooling and heating line 40 by closing the first port 811 of the main valve 810, opening the second port 812 and the third port 813, and operating the indoor HVAC refrigerant line 50. Therefore, the first coolant is cooled by performing the heat-exchange with the refrigerant of the indoor HVAC refrigerant line 50 in the cooling heat exchanger 400 and then cools the high voltage battery core 100. Here, the indoor cooling may also be simultaneously performed, as needed.

FIG. 2 is an illustrative view of a heating mode of the HVAC system of the vehicle according to an exemplary embodiment of the present invention. In the case of the heating mode, the controller 600 controls the main valve 810 and the water heating heater 700 to circulate the first coolant through the branch line 30, and performs a control so that the first coolant heated by the water heating heater 700 heats the high voltage battery core 100. Here, a separate heat exchange does not occur in the cooling heat exchanger 400.

In more detail, in a case in which the high voltage battery core 100 needs to be heated, the controller 600 controls the main valve 810, the water heating heater 700, and the circulation pump 850. Therefore, the controller 600 performs a control so that the first coolant circulates through the water heating heater 700, the circulation pump 850, the high voltage battery core 100, and the main valve 810 within the cooling and heating line 40 by closing the first port 811 of the main valve 810, opening the second port 812 and the third port 813, and operating the water heating heater 700. Therefore, the first coolant is heated by the water heating heater 700 and then heats the high voltage battery core 100.

FIG. 3 is an illustrative view of an external air temperature cooling mode of the HVAC system of the vehicle according to an exemplary embodiment of the present invention. In the case of the external air cooling mode, the controller 600 controls the main valve 810 to circulate the first coolant through the battery circulation line 10, and performs a control so that the first coolant cooled by the battery radiator 200 cools the high voltage battery core 100. Here, the water heating heater 700 is in a stopped state.

In more detail, in a case in which the high voltage battery core 100 needs to be cooled by external air, the controller 600 controls the main valve 810 and the circulation pump 850. The controller 600 performs a control so that the first coolant circulates through the battery radiator 200, the circulation pump 850, the high voltage battery core 100, and the main valve 810 within the battery circulation line 10 by closing the second port 812 of the main valve 810 and opening the first port 811 and the third port 813. Therefore, the first coolant is cooled by circulating through the battery circulation line 10 and performing the heat-exchange with the external air in the battery radiator 200 and then cools the high voltage battery core 100. Here, the indoor cooling may also be simultaneously performed, as needed, and in this case, the controller 600 performs the indoor cooling by operating the indoor HVAC refrigerant line 50.

By changing the configurations in the cooling mode, the heating mode, and the external air cooling mode to the configuration as illustrated in FIG. 4, it is possible to change the configuration so that the first coolant passes through the high voltage battery core 100 and then passes through the cooling heat exchanger 400, and it is also possible to change the position of the main valve 810.

According to the HVAC system of the vehicle as described above, the high voltage battery core 100 is cooled in advance in the external air cooling mode, thereby making it possible to reduce energy, and the branch line 30 is blocked by using the main valve 810 during the failure of the water heating heater 700, thereby making it possible to prevent the high voltage battery core 100 from being permanently damaged by a high temperature coolant which is introduced into the high voltage battery core 100. Further, heat loss during the driving was considered by disposing the cooling heat exchanger 400 in the upstream direction closer to the high voltage battery core 100 than the water heating heater 700. Therefore, the energy may be efficiently managed and the driving distance of the vehicle may be increased.

Although the present invention is shown and described in connection with the specific exemplary embodiments, it is apparent to those skilled in the art that the modifications and variations may be made without departing from the spirit and scope of the invention as defined by the appended claims.

What is claimed is:

1. A heating, ventilating, air conditioning (HVAC) system of a vehicle, the HVAC system comprising:
   a battery circulation line including a battery radiator, a main valve, a high voltage battery core, a cooling heat exchanger, and a first coolant flowing through the battery circulation line, with the cooling heat exchanger configured to be in a heat exchange relationship with an indoor HVAC refrigerant line;
   a branch line including a water heating heater and configured to be selectively connected to the battery circulation line through the main valve; and
   a controller configured to operate the HVAC system to selectively cool or heat the high voltage battery core by controlling the main valve, the water heating heater, and the indoor HVAC refrigerant line,
   wherein the battery circulation line further includes a circulation pump configured to be driven or stopped by the controller, and further configured to circulate the first coolant within the battery circulation line, and
   wherein the battery circulation line is configured such that the first coolant passes sequentially, in order, through the battery radiator, the cooling heat exchanger, the circulation pump, the high voltage battery core, the main valve, and then passes through the battery radiator again.

2. The HVAC system of claim 1, wherein one terminal of the branch line is connected to the main valve and another terminal thereof is connected to the battery circulation line so that the first coolant bypasses the battery radiator by the branch line.

3. The HVAC system of claim 1, wherein a portion of a line including the high voltage battery core and the cooling heat exchanger of the battery circulation line is connected to the branch line to form a cooling and heating line, and
   the cooling and heating line is a closed loop in which the first coolant circulates.

4. The HVAC system of claim 3, wherein the cooling and heating line includes a circulation pump controlled by the controller, and
   the circulation pump is positioned on the battery circulation line corresponding to the cooling and heating line.

5. The HVAC system of claim 3, wherein the cooling heat exchanger is positioned between a point to which the branch line and the battery circulation line are connected and the high voltage battery core, and is provided on the battery circulation line corresponding to the cooling and heating line.

6. The HVAC system of claim 3, wherein the main valve is a 3-way valve and includes a first port which is adjacent to the battery radiator, a second port which is adjacent to the water heating heater, and a third port which is adjacent to the high voltage battery core, and
   when the high voltage battery core needs to be cooled, the controller performs a control so that the first coolant circulates through the cooling and heating line by closing the first port of the main valve and operating the indoor HVAC refrigerant line, is cooled by performing a heat-exchange with a refrigerant of the indoor HVAC refrigerant line in the cooling heat exchanger, and then cools the high voltage battery core.

7. The HVAC system of claim 3, wherein the main valve is a 3-way valve and includes a first port which is adjacent to the battery radiator, a second port which is adjacent to the water heating heater, and a third port which is adjacent to the high voltage battery core, and
   when the high voltage battery core needs to be heated, the controller performs a control so that the first coolant circulates through the cooling and heating line by closing the first port of the main valve and operating the water heating heater, is heated by the water heating heater, and then heats the high voltage battery core.

8. The HVAC system of claim 3, wherein the main valve is a 3-way valve and includes a first port which is adjacent to the battery radiator, a second port which is adjacent to the water heating heater, and a third port which is adjacent to the high voltage battery core, and
   when the high voltage battery core needs to be cooled, the controller performs a control so that the first coolant circulates through the battery circulation line by closing the second port of the main valve, is cooled by performing a heats exchange with external air in the battery radiator, and then cools the high voltage battery core.

9. The HVAC system of claim 1, wherein in a case of a cooling mode, the controller controls the main valve to circulate the first coolant through the branch line, and performs a control so that the first coolant cooled by the cooling heat exchanger cools the high voltage battery core.

10. The HVAC system of claim 1, wherein in a case of a heating mode, the controller controls the main valve and the water heating heater to circulate the first coolant through the branch line, and performs a control so that the first coolant heated by the water heating heater heats the high voltage battery core.

11. The HVAC system of claim 1, wherein in a case of an external air cooling mode, the controller controls the main valve to circulate the first coolant through the battery circulation line, and performs a control so that the first coolant cooled by the battery radiator cools the high voltage battery core.

12. The HVAC system of claim 1, wherein the indoor HVA refrigerant line includes an auxiliary valve that supplies or blocks a refrigerant so that the refrigerant of the indoor HVAC refrigerant line is heat-exchangeable with the first coolant of the battery circulation line in the cooling heat exchanger.

13. The HVAC system of claim 1, wherein, during a failure of the water heating heater, the controller prevents the high voltage battery core from being damaged by a high temperature coolant which passes through the water heating heater and is introduced into the high voltage battery core by controlling the main valve to block the high temperature coolant from flowing into the branch line.

14. A heating, ventilating, air conditioning (HVAC) system of a vehicle, the HVAC system comprising:
  a battery circulation line including a battery radiator, a main valve, a high voltage battery core, a cooling heat exchanger, and a first coolant flowing through the battery circulation line, with the cooling heat exchanger configured to be in a heat exchange relationship with an indoor HVAC refrigerant line;
  a branch line including a water heating heater configured to be selectively connected to the battery circulation line through the main valve; and
  a controller configured to operate the HVAC system selectively cool or heat the high voltage battery core by controlling the main valve, the water heating heater, and the indoor HVAC refrigerant line,
  wherein the battery circulation line further includes a circulation pump which is configured to be driven or stopped by the controller, and further configured to circulate the first coolant within the battery circulation line, and
  wherein the battery circulation line is configured such that the first coolant passes sequentially, in order, through the battery radiator, the main valve, the circulation pump, the high voltage battery core, the cooling heat exchanger, and then passes through the battery radiator again.

* * * * *